United States Patent [19]

Knokey et al.

[11] Patent Number: 4,570,449
[45] Date of Patent: Feb. 18, 1986

[54] REFRIGERATION SYSTEM

[75] Inventors: Charles R. Knokey, Rolling Hills Estates; Paul S. Bedi, El Toro, both of Calif.

[73] Assignee: ACL-FILCO Corporation, Santa Ana, Calif.

[21] Appl. No.: 606,519

[22] Filed: May 3, 1984

[51] Int. Cl.$^4$ ............................................. F25B 39/04
[52] U.S. Cl. ..................... 62/183; 62/238.6; 62/510
[58] Field of Search ................ 62/175, 183, 185, 201, 62/510, 238.6

[56] References Cited

U.S. PATENT DOCUMENTS

| | | | |
|---|---|---|---|
| 2,233,633 | 3/1941 | Mollenberg | 62/510 X |
| 2,700,279 | 1/1955 | Stickel | 62/183 X |
| 3,584,466 | 6/1971 | Kaufman | 62/183 |
| 3,976,123 | 8/1976 | Davies | 62/238.6 X |

Primary Examiner—William E. Wayner
Attorney, Agent, or Firm—Fraser and Bogucki

[57] ABSTRACT

A refrigeration unit (10) includes a temperature control circuit (42) in which a plurality of coils (32) are wrapped around associated compressors (24, 26, 28, 30, 38 and 40) and are arranged in parallel between a supply manifold (44) and a return manifold (46) so that as long as one of the compressors is operating, heat will be transferred into a working fluid flowing through the coils in order to heat any non-operating ones of the compressors. Further, during warm weather, any excess heat can be dissipated from the working fluid to a suitable heat sink as by use of a heat exchanger or any appropriate heat reclaiming process. In extremely cold environments, heat can be added to the working fluid in a suitable manner to maintain the fluid above a predetermined minimum level necessary to assure proper functioning of the compressors.

15 Claims, 5 Drawing Figures

REFRIGERATION SYSTEM

BACKGROUND OF THE INVENTION

1. Field of the Invention

This invention relates generally to refrigeration systems, and more particularly to energy conservation arrangements for refrigeration systems in which a plurality of compressors are operated independently and randomly.

2. History of the Prior Art

Hotels, restaurants, supermarkets, and the like, use many individual refrigeration units which must be separately controlled. In a supermarket, for example, the food freezers must be kept below a given maximum temperature, the refrigerator cabinets must be kept below a higher maximum temperature, and lesser degrees of cooling are used for other special purposes, such as providing additional cooling in the fruits and vegetables department. In restaurants, there are not only frozen food lockers and refrigerators, but also special air conditioning needs for special areas, such as the kitchen. During operation, therefore, refrigeration capacity may be needed at a particular point for a period of time, and then an idle time may ensue before temperature again must be brought down. The problems vary greatly, dependent on outside temperature and internal conditions, and a number of approaches have been devised for meeting the various refrigeration needs. Usually, the refrigeration system, which may be one large unit or a number of individual units, is mounted outside the building, and sensors control switching of the unit on and off as needed.

Saving energy is an important consideration in these systems, because proper usage of refrigeration capacity can effect substantial savings under typical conditions. It is often required, for example, to supply heat to increase the interior temperature of an establishment while running the refrigeration system, so that the two energy consuming systems work against each other. A number of computer controlled systems have been devised for improving the cycling of integrated systems, but the refrigeration system can be treated separately, in that it is desirable to reduce the amount of energy required to deliver refrigeration as needed to a number of different operative units.

Among known units are the multiple-compressor type of refrigeration systems, in which an exterior refrigeration unit, with large cooling fans, is mounted outside the restaurant or store, with individual compressors operating independently as needed by the associated refrigeration units within the store. Typically, freezers and coolers must be operative for, say, 18 hours in a day, and run for about 40–45 minutes per hour in a random fashion. In a multiple compressor system, therefore, one or more compressors are running at practically all times, even when the ambient temperature is extremely cold.

Refrigeration compressors dissipate a considerable amount of heat energy during normal operation, and this heat must be carried off either by ambient air or by other means to prevent the compressors from overheating. If overheating occurs, the compressor is shut down and refrigeration capacity is not available. While this problem occurs primarily during warm weather, it also may occur in cooler weather under certain operating conditions.

In response to this problem, some systems have used individual fans for the separate compressors, these fans drawing considerable amperage and substantially adding to the energy costs.

One specific technique that has been used for cooling compressors only is to wrap a copper coil about the compressor and circulate water through it, in a conventional heat exchange relation. The system condenser itself, however, is water-cooled and, thus there is no energy saving, although there is protection against compressor overheating.

A separate problem arises during cold weather, when the refrigeration requirements are satisfied and the compressor cycles off. It may remain off for a long enough period to cool down below the source temperature, which causes refrigerant to be drawn into the compressor, diluting the compressor lubricating oil. The diluted oil foams excessively on restart of the compressor, providing poor lubrication and excessive oil loss into the system. This loss of oil may leave the compressor with insufficient oil for lubrication, precipitating early compressor failure.

U.S. Pat. No. 4,411,141, issued Oct. 25, 1983, to A. Hara, discloses a parallel operation compressor in refrigeration apparatus where lubricant is forced from the crankcase of one compressor to another compressor. If this approach were used in a multi-compressor system as discussed above, however, it would result in a very expensive unit requiring specially constructed compressors.

SUMMARY OF THE INVENTION

The present system provides for integrated heat transfer between colder and warmer units in a multi-compressor system. Supply and return manifolds are coupled to the individual compressors by heat exchange tubing wrapped about the compressors. A low freezing point, high boiling point fluid is circulated in a closed system incorporating the manifolds and the compressor coils, by a pump in circuit with the loop. Thus, whichever compressors are running supply heat to the circulating fluid, which also in warm weather passes through an air-to-fluid heat exchanger in the loop. A single fan directed across the heat exchanger dissipates the heat to the ambient atmosphere under warm weather conditions, and the cooling fluid is then recirculated back to the supply manifold through a sealed coolant reservoir. When the ambient temperature is substantially lower, below a predetermined threshold, a diverter valve in the recirculation loop bypasses the heat exchanger, retaining the heat energy in the fluid. The heat input from the operating compressors, plus the heat input from the circulating pump, operates to hold the circulating fluid sufficiently warm to keep the non-operating compressors from dropping below a desirable temperature minimum during their off cycle. In extremely cold conditions, a small heater in the reservoir is adequate to provide supplementary heat so as to maintain the desired temperature level.

This system, which has only a small circulator in constant operation and which is completely closed so that there is no contamination of the refrigeration loops, effects a substantial saving of energy because the compressors are kept cool for efficient operation in warm weather, because heat is conserved in cold weather, and because cooling of the circulating fluid is achieved with only a single fan, thereby minimizing amperage requirements.

An alternative system further utilizes thermal energy available in the heat exchanger in a separate interchange loop with an incoming water supply. Instead of dissipating heat to atmosphere, in the air-to-fluid exchange, a fluid-to-fluid exchange is used to preheat the water, as for a hot water tank.

Systems in accordance with the invention eliminate the need for an external heater in a roof installation, eliminate the usage of separate crankcase heater, and reduce the average energy usage of a given refrigeration system from, for example, approximately 80 amps to 40 amps for a typical installation.

BRIEF DESCRIPTION OF THE DRAWINGS

A better understanding of the invention may be had by reference to the following description, taken in conjunction with the accompanying drawings, in which:

FIG. 5 is a fragmentary, schematic diagram illustrating the use of heat transfer apparatus according to the present invention for preheating water, and the like.

DETAILED DESCRIPTION OF THE INVENTION

Figure 1:
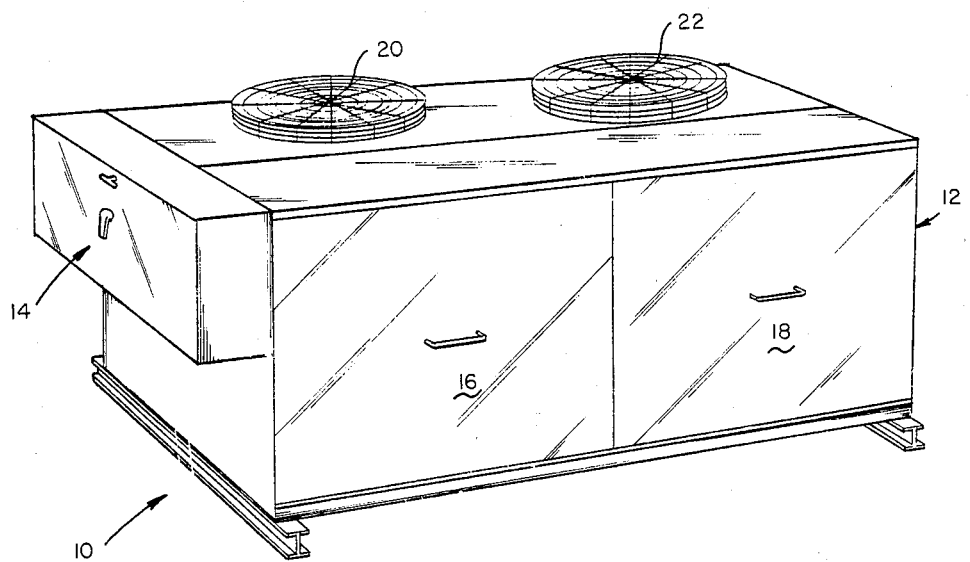
FIG. 1 is a diagrammatic, perspective view, showing a refrigeration unit employing temperature control apparatus according to the present invention.

Referring now more particularly to FIG. 1 of the drawings, a refrigeration unit 10 includes a generally rectangular cabinet 12 on the left side of which is shown mounted a control box 14 for housing conventional electrical controls (not shown) and the like. Provided on the front side of cabinet 12 are a pair of doors 16 and 18 arranged for permitting ready access to apparatus contained within cabinet 12, while on the upper surface of cabinet 12 are shown a pair of grills 20 and 22, each providing a vent for a condenser fan (not shown) disposed beneath the associated grill within cabinet 12.

Although it is to be understood that the present invention requires only a single fan to operate, it has been found that the size and number of compressors commonly employed in commercial refrigeration units, such as unit 10, require more than one fan in a given unit in order to handle the peak heat transfer loads.

Cabinet 12 is of conventional construction, and is intended to be arranged either on the roof of a commercial building or on a concrete slab or other support immediately adjacent such a building. Such refrigeration systems as represented by unit 10 are conventional and commonly employed. The construction and operation of the refrigeration portion of such units will not be described in detail herein.

Figure 3:
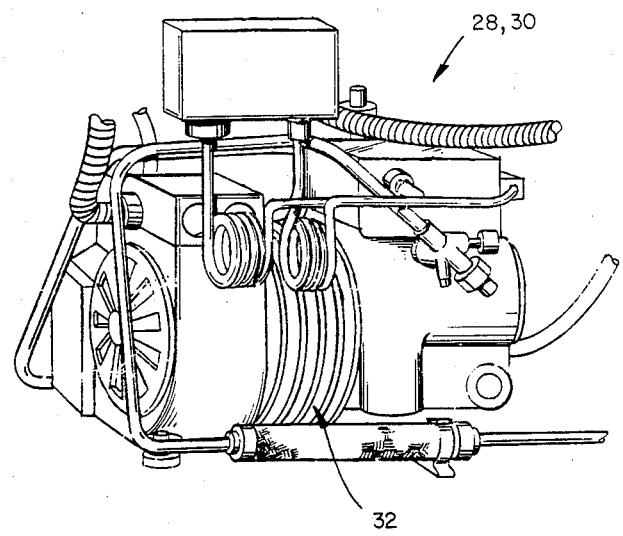
FIG. 3 is an enlarged, fragmentary, perspective view, showing the manner of wrapping a heat transfer coil around a compressor of the refrigeration unit seen in FIGS. 1 and 2.
Figure 2:
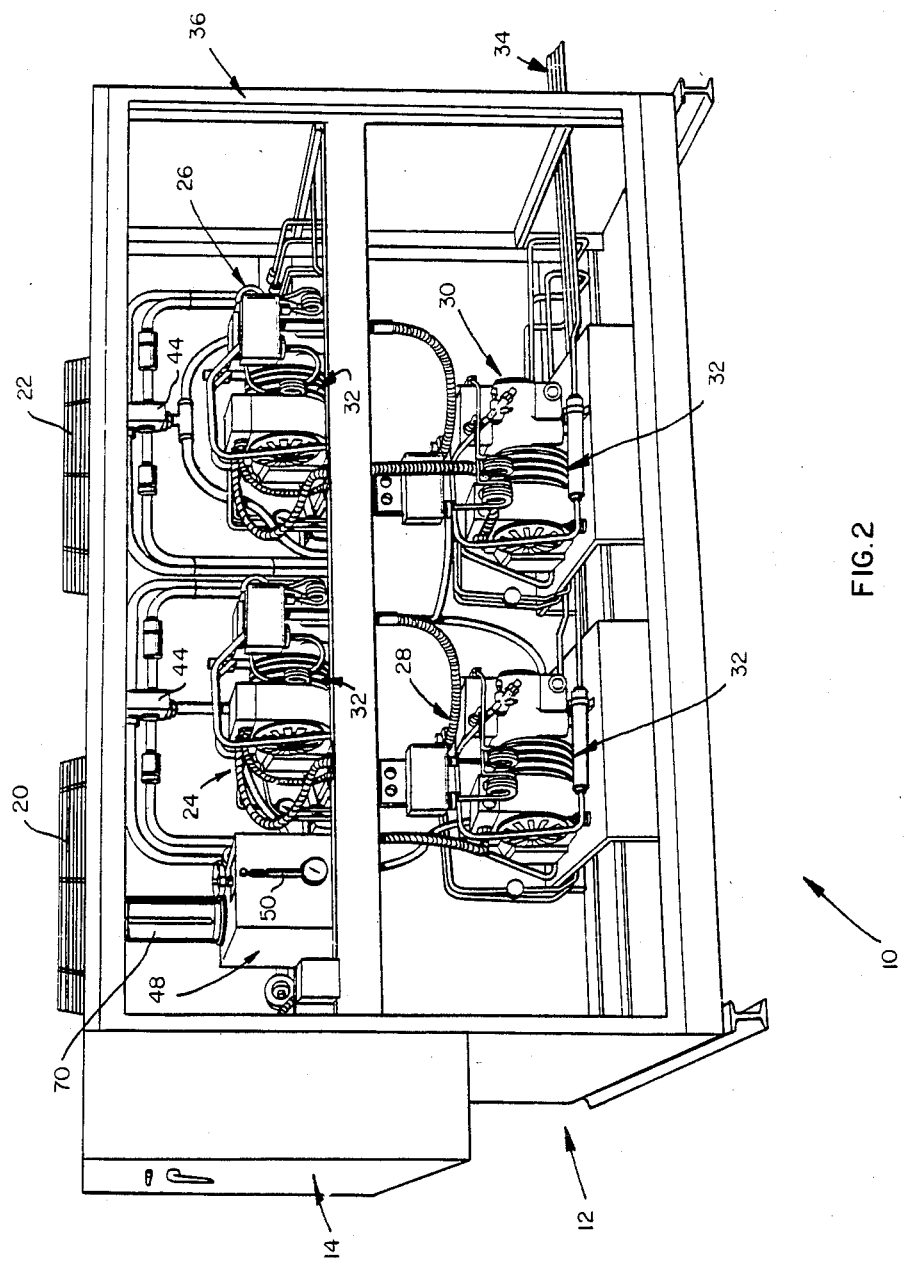
FIG. 2 is a partially diagrammatic, perspective view, similar to FIG. 1, but drawn to a larger scale and with parts of the cabinet removed so as to reveal details of the apparatus.

As can be seen from FIGS. 2 and 3 of the drawings, unit 10 includes a plurality of compressors 24, 26, 28 and 30 with space being provided on the right-hand side of cabinet 12 for an additional two compressors similar to those illustrated. Each of the compressors 24 . . . 30 has wrapped around the central portion of the housing of same a coil 32 of fluid-conducting tubing, and the like, arranged for forming a heat exchanger with respect to the associated compressor in order to transfer heat to or from the device.

As can be seen in FIG. 2, a plurality of lines 34 extend from the right-hand side of framework 36 of cabinet 12 in order to arrange in a neat and orderly manner liquid and suction lines for all systems of unit 10. This includes normally capped lines for the heat transfer system as to be described in detail in conjunction with FIG. 4 for a purpose which will become clear below in conjunction with the discussion of FIG. 5 of the drawings.

Figure 4:
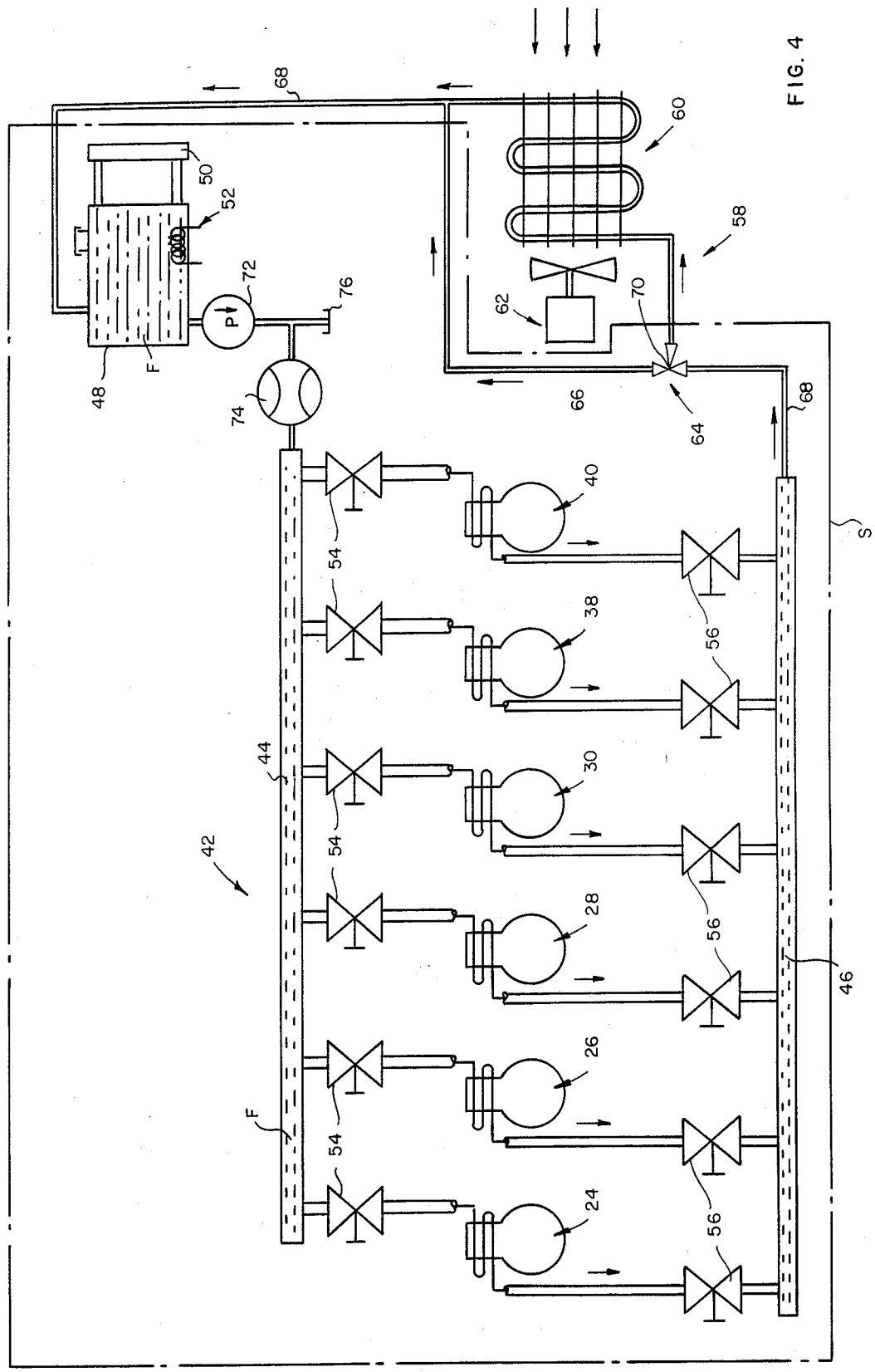
FIG. 4 is a schematic diagram disclosing heat transfer apparatus according to the present invention, and as usable with the refrigeration unit illustrated in FIGS. 1 and 2.

Referring now more particularly to FIG. 4, the apparatus for controlling temperature in compressors of a refrigeration unit, such as unit 10, will now be described. Although the number of compressors used may vary as desired, a total of six compressors are illustrated in FIG. 4, with compressors 24, 26, 28, and 30 illustrated in FIG. 2 described above. The apparatus includes a heat exchange circuit 42 arranged for circulating a working fluid F, such as a suitable liquid, and the like, having a low freezing point and high boiling point, to the six illustrated compressors. It is to be understood that at least one of the compressors 24, 26, 28, 30, 38 and 40, will typically be operating at any given time, which can be assured by careful sizing of the system relative to the load and ambient conditions. Short dormant intervals are of no significance, because little heat loss results. In the great majority of installations, heat is constantly being transferred into the working fluid F being carried through circuit 42. The latter includes the aforementioned coils 32 wrapped around the compressors 24, 26, 28, 30, 38 and 40. The aforementioned coils coils 32 are arranged between and are connected to a supply manifold 44 and a return manifold 46, with the latter being connected to the supply manifold 44 in order to form the aforementioned fluid conducting circuit 42.

Circuit 42 also includes a reservoir assembly 48 inserted between manifold 46 and manifold 44 for assuring a steady flow of the working fluid F to supply manifold 44. This reservoir 48, which is illustrated as being provided with a conventional sight gauge 50 on the front portion thereof so as to be observed by opening the doors 16, 18 of cabinet 12, as can be seen in FIG. 2, advantageously can be provided with a conventional heater device 52, such as a conventional electrical heater and the like, to supplement heat added to the working fluid in circuit 42 by the compressors 24 . . . 30, 38 and 40. Although heater device 52 does not form a basic part of heat transfer apparatus according to the present invention, and is not employed in normal operating situations, it has been found desirable to use such a device in extremely cold climates such as encountered in subpolar regions.

Each coil 32 is arranged on a branch of circuits 42, in parallel with each of the other coils 32, in series with shut off valves 54 and 56 for balancing the flow through the particular parallel leg of circuit 42 in conjunction with each of the other legs thereof. Since such balancing procedures are commonly employed and well known in the refrigeration art, the procedure to be used will not be described in greater detail herein. The valves 54, 56 can also be used to isolate a particular compressor, e.g. 30, for replacement.

Apparatus for temperature control according to the invention also includes a temperature control arrangement 58 associated with the heat exchange circuit 42 for maintaining temperature of a working fluid within circuit 42 to predetermined limits and maintaining a predetermined minimum temperature on all non-operating ones of the compressors 24 . . . 30, 38 and 40.

Control arrangement 58 includes a heat exchanger 60 of generally conventional construction and including a plurality of loops as illustrated. Heat exchanger 60 is provided between return manifold 46 and supply manifold 44 for dissipating, to a suitable heat sink (such as the ambient atmosphere), any unneeded heat transferred to the working fluid F within circuit 42, and for this purpose a conventional fan 62 can be provided for facilitating the air-to-liquid exchange process. Although a conventional air-to-liquid heat exchanger arrangement is illustrated, it is to be understood that other arrangements can be employed as desired and advantageous, and further that apparatus according to the invention can be modified to dissipate excess heat in other advantageous manners, an example of which will be discussed below.

Control arrangement 58 also includes a diverter assembly 64 arranged for bypassing the heat exchanger 60 whenever all heat in the working fluid within circuit 42 is needed to maintain temperature within the working fluid F above a desired temperature. Basically, diverter assembly 64 comprises a bypass line 66 around heat exchanger 60 and inserted into a return line 68 feeding from manifold 46 into reservoir assembly 48, and to which also is connected an output of heat exchanger 60. At the junction of line 66 and the inlet to heat exchanger 60 is a thermally responsive three-way valve 70 arranged for selectively directing fluid flow between heat exchanger 60 and the bypass line 66. While the temperature settings of the selected valves can vary depending on a particular situation, it has been found desirable to use 70° F. (21.11° C.) as the cutoff temperature with valve 70 opening, at least partially, above this temperature to divert working fluid into heat exchanger 60.

Circuit 42 also includes a conventional fluid pump 72, which is illustrated in FIG. 4 as being arranged on the discharge of reservoir assembly 48, but in a preferred embodiment is disposed within the assembly 48 itself. FIG. 2 shows the motor of pump 72 extending upwardly from the rear portion of the reservoir assembly 48. Also included in circuit 42 can be a conventional flow indicator 74 and appropriately arranged drain 76, which is conventional with such fluid circuits.

Figure 5:
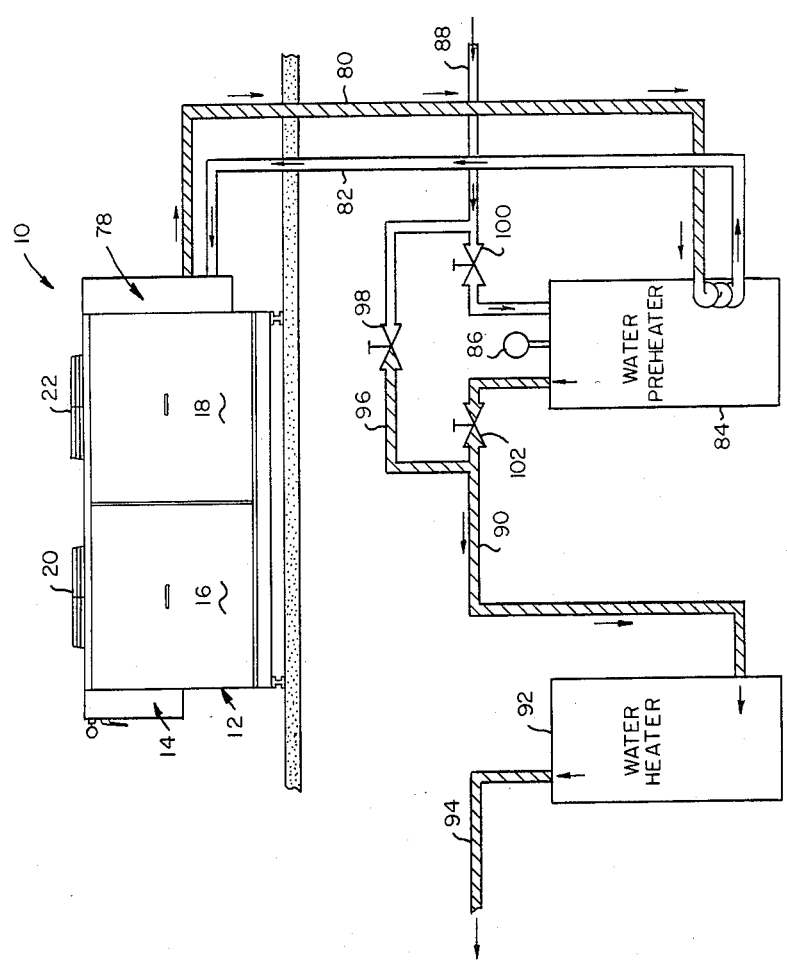

FIG. 5 illustrated an alternative arrangement for dissipating excess heat within circuit 42, wherein a heat reclaim module 78 is arrangeable on the right-hand side of cabinet 12 of a refrigeration unit 10 in accordance with the present invention so as to permit a tie-in to the lines 34 terminating outside of cabinet 12 and which carry the working fluid of circuit 42. Although not illustrated in FIG. 4, it is to be understood that these lines 34 include normally capped off lines extending around heat exchanger 60 so as to provide an alternative heat dissipation circuit. More specifically, extending from module 78 are outlet and return lines 80 and 82 extending into a water preheater 84, and the like, for dissipating the excess heat therein. More specifically, preheater 84 preferably is an insulated storage tank, and the like, advantageously with a double wall heat exchanger (not shown) of conventional construction, and provided on the top or other suitable portion thereof with a conventional pressure release valve 86. Extending into preheater 84 is a conventional cold water line 88, and the like, as from a city water supply, and extending from preheater 84 is a line 90 to a conventional, usually existing, water heater 92 having an outlet 94. Extending between lines 88 and 90 is a bypass line 96 having inserted therein a conventional control valve 98 for permitting the water supply to bypass preheater 84 whenever modulating valve 70 of unit 10 is bypassing the working fluid from the heat dissipating apparatus and retaining the heat within circuit 42. More specifically, valve 98 can be opened whenever valves 100 and 102, provided on lines 88 and 90 respectively, are closed, in any suitable, known manner, so as to cause the water heater 92 to receive a cold water supply in a conventional manner. When it is desired to dissipate heat from circuit 42, however, valve 70 will open and cause working fluid to run through line 80 and into preheater 84. In this mode, valve 98 will be closed and valves 100 and 102 opened in order to preheat the incoming water prior to final heating thereof in water heater 92.

As can be understood from the above description and from the drawings, heat transfer apparatus according to the present invention will provide sufficient cooling of the compressor during warm weather, while reducing system power consumption and increasing efficiency. Further, the same system provides adequate heating during compressor off-cycle winter operations, and the like, by using the thermal energy from at least one compressor operating at substantially all times and transferring the heat generated by this operating compressor to any of the non-operating compressors.

Since various changes and modifications of the invention will occur to and can be made readily by those skilled in the art without departing from the invention concept, the invention is not to be taken as limited except by the scope of the appended claims.

What is claimed is:

1. Apparatus for controlling temperatures in a plurality of independently operating compressors of a refrigeration unit, wherein at least one of the compressors is operating at substantially all times, the apparatus comprising, in combination:

(a) transfer means including conduit means containing a liquid heat transfer working fluid for circulating the working fluid to the plurality of compressors in the refrigeration unit, and transferring heat from the operating compressor or compressors to the working fluid, the conduit means being in thermal interchange relation with each of the compressors, the transfer means including a plurality of coils equal in number to the number of compressors in an associated refrigeration unit, each of the coils associated with a different respective one of the compressors, a supply manifold and a return manifold, the coils connected to and arranged extending between the supply manifold and the return manifold, and a return line coupled to the return manifold and to the supply manifold bypassing the coils, for completing a fluid-conducting circuit; and (b) temperature control means associated with the transfer means for maintaining the temperature of the liquid between predetermined limits and maintaining a predetermined minimum temperature on all non-operating ones of the compressors, the temperature control means including heat exchanger means coupled in the return line between the return manifold and the supply manifold for dissipating to a heat sink any unneeded heat transferred to the working fluid.

2. Apparatus as defined in claim 1, wherein the heat exchanger means is an air-to-liquid heat exchanger including at least one fan.

3. Apparatus as defined in claim 2, wherein the heat sink is a water preheater means connectable to a water heater for heating cold water prior to feeding the water to the water heater.

4. Apparatus as defined in claim 1, wherein the temperature control means further includes a diverter means responsive to fluid temperature for bypassing the heat exchanger means whenever all heat in the working fluid is needed to maintain a predetermined temperature within the working fluid.

5. Apparatus as defined in claim 4, wherein the diverter means includes a thermally responsive three-way valve inserted between the return manifold and the heat exchanger means.

6. Apparatus for controlling temperatures in a plurality of independently operating compressors of a refrigeration unit, wherein at least one of the compressors is operating at substantially all times, the apparatus comprising, in combination:
(a) transfer means for circulating a heat transfer working fluid to the plurality of compressors in the refrigeration unit, and transferring heat from the operating compressor or compressors to the working fluid; and
(b) temperature control means associated with the transfer means for maintaining the temperature of the working fluid within predetermined limits and maintaining a predetermined minimum temperature on all non-operating ones of the compressors, the transfer means including a plurality of coils equal in number to the number of compressors in an associated refrigeration unit, each of the coils associated with a respective one of the compressors, a supply manifold and a return manifold, the coils connected to and arranged extending between the supply manifold and the return manifold, and a return line coupled to the return manifold and to the supply manifold bypassing the coils, for completing a fluid-conducting circuit, the temperature control means including heat exchanger means coupled in the return line between the return manifold and the supply manifold for dissipating to a heat sink any unneeded heat transferred to the working fluid, the temperature control means further including a diverter means responsive to fluid temperature for bypassing the heat exchanger means whenever all heat in the working fluid is needed to maintain a predetermined temperature within the working fluid, the diverter means including a thermally responsive three-way valve inserted between the return manifold and the heat exchanger means, and the heat sink being a water preheater means connectable to a water heater for heating cold water prior to feeding the water to the water heater.

7. Apparatus as defined in claim 6, wherein the transfer means further includes a reservoir means inserted between the return manifold and the supply manifold in series with the temperature control means for assuring a steady flow of fluid to the supply manifold, the reservoir means including heater means for providing supplementary heat as necessary in extremely cold environments.

8. In combination with a refrigeration unit, including a plurality of independently operating compressors, and at least one condenser fan, apparatus for maintaining temperature levels at all the compressors in a predetermined range, comprising in combination:
(a) conduit means for circulating a liquid working fluid in direct thermal energy transfer relation with each of the compressors, such one or more of the compressors as are operating at a given time transferring heat to the working fluid and hence to the other compressors; and
(b) temperature control means including heat exchanger means coupled to the conduit means and responsive to the temperature of the working fluid for maintaining the temperature of the working fluid within predetermined limits by (1) circulating the working fluid directly to hold a predetermined minimum temperature on all non-operating ones of the compressors when the temperature is low and (2) circulating the working fluid through the heat exchanger means when the temperature approaches the high limit.

9. Apparatus as defined in claim 8, wherein the conduit means includes a plurality of coils equal in number to the number of compressors in an associated refrigeration unit, each of the coils being in thermal energy relation with a different respective one of the compressors, a supply manifold and a return manifold, the coils being coupled in a fluid circuit between the supply manifold and the return manifold, and the return manifold being coupled to the supply manifold for forming a fluid-conducting circuit.

10. Apparatus as defined in claim 9, wherein the heat exchanger means is an air-to-liquid heat exchanger including at least one fan.

11. Apparatus as defined in claim 10, wherein the temperature control means further includes diverter means responsive to the working fluid temperature for bypassing the heat exchanger means whenever all heat in the working fluid is needed to maintain a predetermined temperature within the working fluid.

12. Apparatus as defined in claim 11, wherein the diverter means includes a temperature responsive valve means between the return manifold and the heat exchanger means.

13. Apparatus as defined in claim 12, wherein the conduit means further includes reservoir means inserted between the return manifold and the supply manifold for assuring a steady flow of fluid to the supply manifold, the reservoir means including heater means responsive to the working fluid temperature for providing supplementary heat as needed to maintain temperature above a predetermined minimum in extremely cold environments.

14. A method of controlling temperature in compressors of refrigeration units, comprising the steps of:
(a) circulating a working liquid in a closed path between individual ones of a plurality of independent compressors in a refrigeration unit;
(b) transferring heat to the working liquid from the such one or more of the compressors as is operating at any time;
(c) using the heat transferred to the working liquid to heat non-operating ones of the compressors above a predetermined minimum temperature, the step of using the heat including the step of dissipating to a heat sink any unneeded heat transferred to the working fluid; and
(d) dissipating heat from the working liquid to maintain the temperature below a predetermined maximum, the step of dissipating to a heat sink including the steps of using a cold fluid as the heat sink and preheating the cold fluid with the dissipated heat prior to subsequent use.

15. A method as set forth in claim 14, wherein the step of transferring includes the step of adding additional heat to the working liquid whenever heat transferred to the working liquid by circulation drops below a predetermined level.

* * * * *